July 29, 1969 K. EICKMANN 3,457,808
HYDROSTATIC-MECHANICAL TRANSMISSION
Filed Sept. 6, 1966 3 Sheets-Sheet 2

INVENTOR
KARL EICKMANN

BY
ATTORNEY

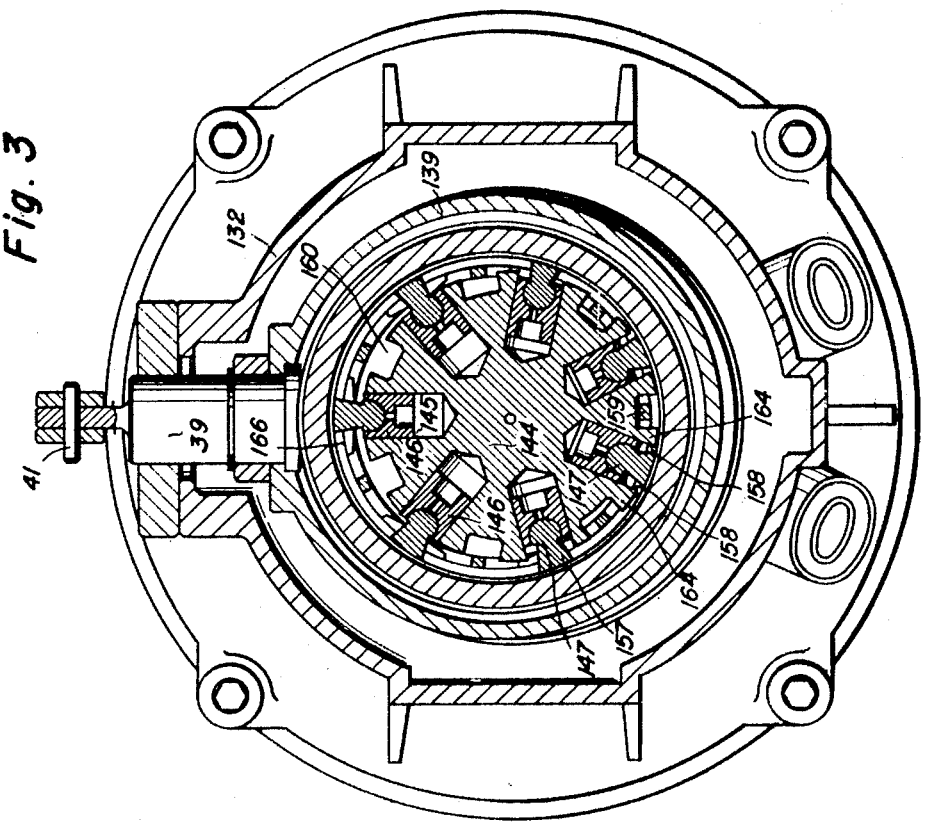

United States Patent Office
3,457,808
Patented July 29, 1969

3,457,808
HYDROSTATIC-MECHANICAL TRANSMISSION
Karl Eickmann, 2420 Isshiki, Hayama-machi,
Kanagawa-ken, Japan
Filed Sept. 6, 1966, Ser. No. 577,422
Claims priority, application Germany, Sept. 6, 1965,
E 30,040
Int. Cl. F16h 47/00
U.S. Cl. 74—730                                         12 Claims

ABSTRACT OF THE DISCLOSURE

A rotary member, such as a wheel or propeller, is driven from a transmission member which is either driven by fluid operated motors to which fluid is supplied by an adjustable pump driven by a power plant, or by a mechanical transmission from the pump shaft including clutch means by which the pump shaft is directly coupled with the same transmission member on which the fluid operated motor acts.

Background of the disclosure

Combined hydrostatic-mechanical transmissions for transferring the torque of a power plant directly or indirectly to driven rotary members are known.

It is the object of the present invention to improve the known transmission arrangements of this type, and to obtain different transmission ratios between a prime mover and a rotary driven member by adjusting the pump from which the fluid operated motors are driven.

Another object of the invention is to provide a transmission of this type in which the mechanical connection between the pump shaft and the rotary member has a different ratio than the ratio between the prime mover and the rotary driven member.

One embodiment of the invention comprises a power plant, such as a combustion engine, pump means which can be adjusted between a maximum output in one flow direction, a maximum output in the opposite flow direction, and a neutral condition in which no fluid is pumped; at least one fluid operated motor connected with the pump and driven at a speed depending on the adjusted fluid volume of the pump; transmission means connected with a rotary driven member, such as a wheel or propeller, and including a transmission member driven by the fluid operated motor; and clutch means connecting an end of the pump shaft, whose other end is driven by the power plant, with the transmission member and being operable to connect and disconnect the pump shaft from the transmission member. In this manner, the rotary driven member can be selectively driven by torque transmitted from the pump shaft through the clutch means to the transmission member, or by a torque produced by the fluid operated motor and depending on the adjusted condition of the pump.

In accordance with the present invention, the pump is constructed so that by operation of control bodies, leakage is prevented along the pump rotor without producing substantial friction so that the pump shaft can be used as part of a mechanical transmission without adding frictional losses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 3 is a cross-sectional view taken on line III—III in FIG. 2.

Description of the preferred embodiments

Figure 1:
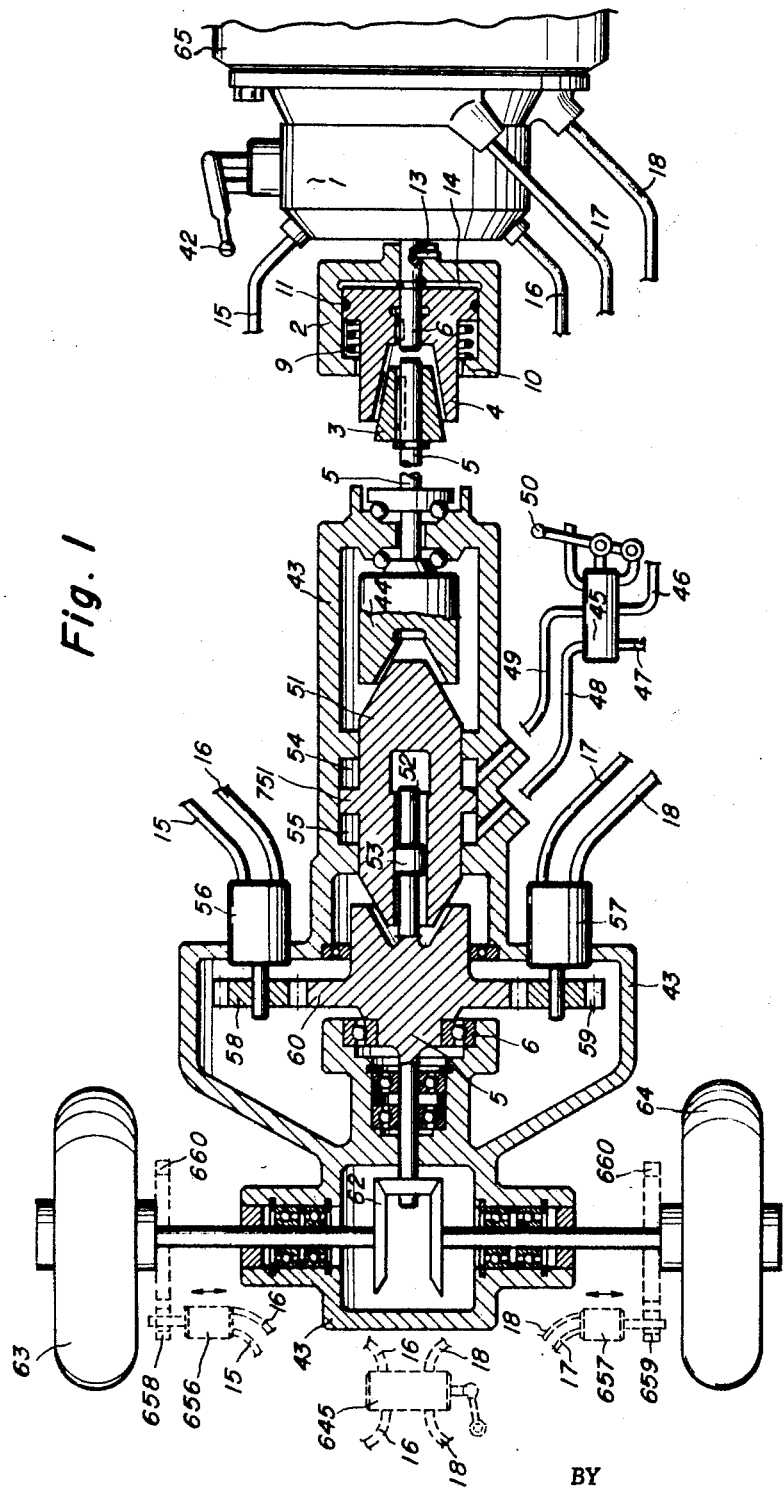
FIG. 1 is a plan view, partially in section, illustrating an embodiment of the invention.

A power plant or prime mover 65 drives the shaft and rotor of a hydrostatic pump 1 which is provided with an adjusting device 42 by which the displacement volumes of the working chambers of pump 1 can be gradually and continuously adjusted. In the embodiment of FIG. 1, hydrostatic pump 1 has two inlets 15 and 17 and two outlets 16 and 18 for two separated flows of fluid. A shaft extends axially through the pump and has a portion 6 to which a connecting means 2 is secured by attaching means 13. A clutch 4 is located in the housing of connecting means 2 and is operable in axial direction by pressure fluid in pressure chamber 14. A sealing ring 11 seals the space between the housing 2 and the movable clutch member 4 which has a portion of reduced diameter surrounded by a spring 9 which abuts a shoulder 10 of housing 2 and another shoulder on clutch member 4. The action of spring 9 is opposed to the action of the fluid pressure in chamber 14. Clutch member 4 has a frusto-conical seat cooperating with a frusto-conical clutch member 3 secured to a transmission shaft 5 so that the same can be coupled with drive shaft 6. It will be understood that transmission shaft 5 and drive shaft 6 can be connected or disconnected by operation of the clutch means 3 and 4. When pressure fluid is supplied into pressure chamber 14 in the usual manner, clutch member 4 is moved against the action of spring 9 to a position coupled with clutch member 3 and transmission shaft 5 so that the same is driven from the prime mover 65. When the pressure in chamber 14 is reduced, the spring disengages clutch means 3, 4.

Figure 2:
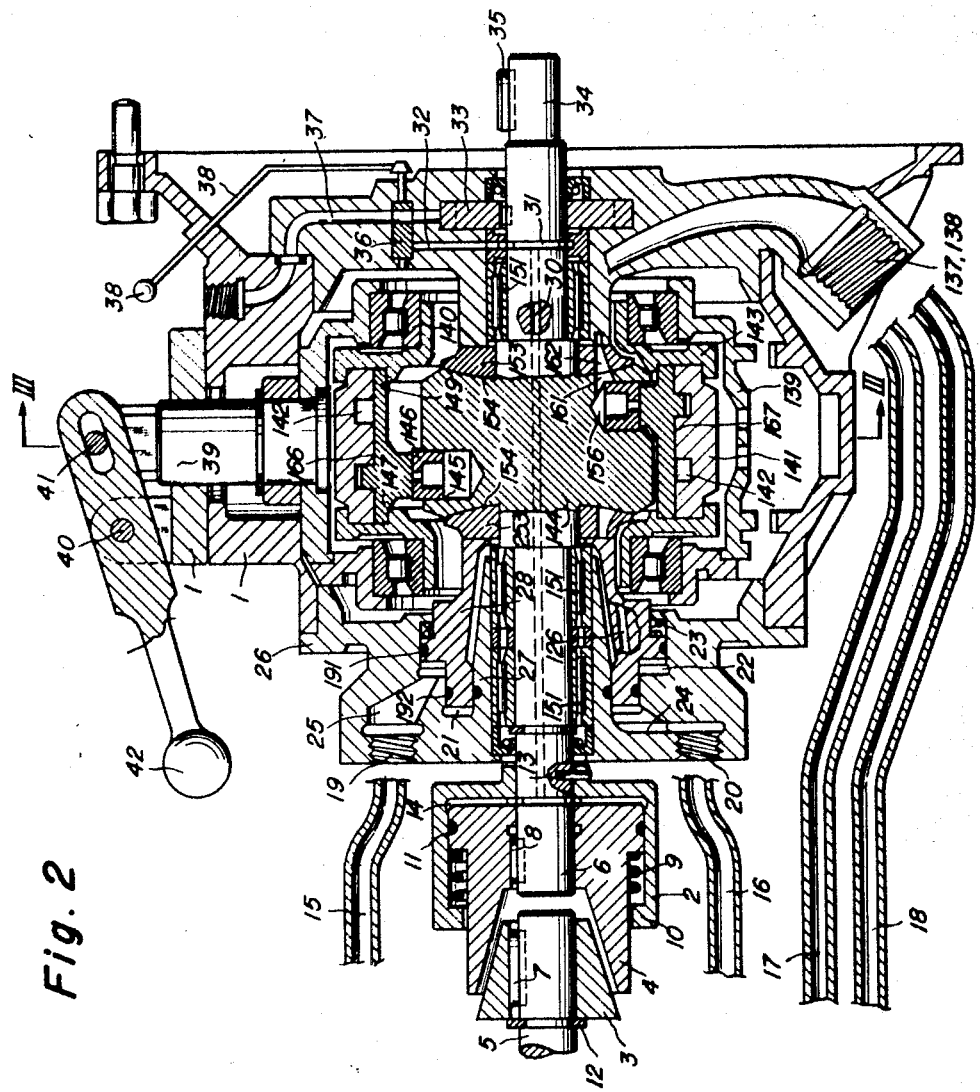
FIG. 2 is an axial sectional view illustrating a pump used in the embodiment of FIG. 1.

Clutch means 3, 4 is shown in detail in the left portion of FIG. 2 where it is clearly shown how the revolving housing 2 is secured to shaft 6 by attaching means 13 and 8, while clutch member 3 is secured to transmission shaft 5 by attaching means 7 and 12. Clutch member 3 is not movable in axial direction on transmission shaft 5, while clutch member 4 is movable in axial direction.

Transmission shaft 5 is mounted in transmission housing 43 rotatable, but non-movable in axial direction. Thrust bearings abut flange portions secured to shaft 5 and a wall of housing 43. Another clutch means 51, 44 is provided in transmission housing 43, clutch member 44 being secured to shaft 5, and clutch member 51 being movable in transmission housing 43. Clutch member 51 has an annular peripheral piston portion 751 located between annular cylinder walls of housing 43 and forming annular fluid pressure chambers 54 and 55 on opposite sides of the annular piston 751. Clutch member 51 is movable in axial direction by fluid supplied to pressure chambers 54 or 55, respectively, through conduit 48, 49 controlled by a valve 45 to which fluid is supplied or discharged through conduits 46 and 47 when valve 45 is operated by the handle 50.

By supplying pressure fluid to one of chambers 54, 55, and by permitting discharge from the respective other pressure chamber, clutch member 51 is axially shifted between a position engaging clutch member 44, and a position disengaged from the same, as shown in FIG. 1.

Clutch member 51 has an inner bore into which a shaft 52 with a piston portion 53 projects. The shaft 52 is part of a transmission member 60 which has a shaft portion connected to a differential gear means 62 from which the wheels 63 are driven. Transmission member 60 is rotatably mounted in bearings supported by the housing 43, and is non-movable in axial direction. Transmission member 60 has a clutch portion provided with a frusto-conical seat, cooperating with a conical clutch surface on the axially movable clutch member 51, and it will be seen that clutch member 51 has two axially displaced positions coupled with clutch member 44 or with the clutch portion of transmission member 60.

By operation of handle 50 and valve 45, clutch member 51 can be moved between the two operative clutching positions, and the intermediate position shown in FIG. 1, disengaged from members 60 and 44.

Transmission member 60 has a peripheral gear meshing with a pair of gears 58 and 59 driven by hydrostatic motors 56 and 57 to which fluid lines 15 to 18 are connected. If, for example, fluid under pressure flows from pump 1 through fluid lines 16 and 18, motor 56 and motor 57 will be driven while fluid is returned through fluid lines 15 and 17 to pump 1. If pump 1 is adjusted to reverse the flow, then fluid flows through fluid line 15 into motor 56 to reverse the direction of rotation of the same whereupon the fluid flows through line 16 back to pump 1. At the same time, a separate flow of fluid flows through line 17 and into fluid motor 57, driving the same, whereupon the fluid is returned through fluid line 18 to hydraulic pump 1.

In a modified embodiment, the motors may be arranged as shown in phantom lines on the left of FIG. 1. Fluid motors 656 and 657 drive gears 658, 659 meshing with gears 660 on the wheel shafts. Instead of wheels 63, propellers, and rotors may be mounted on the driven shaft.

A fluid valve 645 may be connected with fluid lines 15 to 18 for separating or combining the two separate fluid lines with others. If fluid lines 16 and 18 are connected by valve 645 the fluids communicate so that the fluid pressures are equalized and a differential action takes place between the rotors or wheels 63, 64, permitting one of the same to rotate faster or slower than the other.

When fluid valve 645 separates the fluid lines 16 and 18, then the differential action does not take place.

In the arrangement of FIG. 1, power can be transmitted in different ways:

(a) The prime mover 65 drives pump 1 which supplies two flows of hydraulic fluid for driving hydrostatic motors 656 and 657 by which the rotary members 63 and 64 are driven to revolve with equal or proportionate angular velocity.

(b) By providing communication between the fluid lines by valve 645, a differential action takes place between fluid motors 656 and 657 so that one or the other rotary member 63 can rotate faster or slower than the other.

(c) Prime mover 65 drives pump 1 which supplies two flows of fluid motors 56 and 57 which drive transmission member 60 through gears 58, 59 so that the differential transmission 62 is driven.

During the three operations described in paragraphs (a), (b) and (c), clutch means 3, 4 may be disengaged so that transmission shaft 5 is not driven from prime mover 65.

At the same time, transmission member 60 can be disconnected from shaft 5 by holding clutch member 51 in the illustrated intermediate position.

When clutch means 3, 4 is engaged, and clutch member 51 is coupled with clutch member 44, a mechanical connection is established, and the output torque produced by prime mover 65 is transmitted through pump shaft 6, transmission shaft 5, clutches 4, 3 and 51, 44 and the coupling 53 to transmission member 60 and differential gear means 62 to the rotor members 63.

Piston 53 has axially extending splines or key grooves cooperating with corresponding key portions in the interior of clutch member 51 so that the same is connected for rotation with transmission member 60.

If a mechanical drive is established, pump 1 and motors 56 and 57 must freely rotate, or motors 56, 57 with transmission gears 58, 59 are disconnected from the transmission member 60.

For example, fluid motors 56 and 57 are shifted in axial direction with gears 58, 59 and thereby disconnected from transmission member 60.

It is also possible to provide a valve for establishing communication between the fluid lines 15 to 18 so that the fluid of pump 1 is circulated without susbtantial losses through pump 1 whereby no fluid under pressure is supplied to motors 56, 57 which freely revolve with the mechanically driven transmission member 60.

It will be seen that power from the power plant or prime mover 65 can be supplied to the rotary members 63 hydrostatically as well as completely mechanical, and that it is possible to transfer power with or without a special fluid circuit 645, 656, 657 by which the two rotary members 63 can be connected for synchronous rotation, or permitted to rotate at different speeds.

It is possible to switch during operation from the hydrostatic power transmission to the mechanical power transmission so that the hydrostatic or mechanical transmission can be used for time periods determined by the operator.

When the output of pump 1 is adjusted by adjusting means 42, the hydraulic power output is adjusted. A neutral position can be set so that pump 1 delivers no fluid and the rotor of the pump freely revolves during the mechanical power transmission so that no fluid is supplied to the motors 56 and 57.

FIGS. 2 and 3 illustrate the hydrostatic pump 1 in detail. Pump 1 is of a type permitting a radial adjustment of the displacement chambers which is particularly suitable since it has a comparatively small axial extension. Furthermore, in pumps of this type, the pump shaft can extend directly through the center of the pump which is important in a combined hydrostatic and mechanical power transmission. The adjusting means of the construction of FIG. 2 for radially adjusting the displacement chambers, controls a particularly large volume of fluid resulting in very high pressure produced by the pump.

In a pump casing 1, a rotor 144 with pump shaft portions 6 and 34 is supported in bearings 151 for rotation. Rotor 144 has two groups of radial displacement chambers 145 and 156 in which displacement elements 146 move in radial direction outward and inward. The displacement elements 146 are assemblies including slide shoes 147 with faces 166 by which they are guided while sliding along the inner annular surface 167 of a preferably revolving actuator ring 141.

Actuator ring 141 is supported in support rings 143 mounted in bearings 140 for free rotation. Bearings 140 are adjustable in radial direction by the adjusting means 139 by which the pump is adjusted between a neutral condition in which no fluid is delivered through the outlet conduits 16 and 18, a position of actuator ring 141 in which the eccentricity of the rotor in relation to the actuator ring 141 is a maximum in one direction so that a maximum flow in one direction is produced, and a position in which the eccentricity is opposite so that a maximum flow in the opposite flow direction is produced. Consequently, by operation of the adjusting means 139, the direction and rate of flow can be adjusted between maximum volumes of fluid discharged either through conduits 16, 18 or conduits 15, 17. In the eccentric positions in which fluid is pumped and delivered, the center of the actuator ring 141 is displaced in opposite radial directions relative to the axis of shaft means 6, 34.

Within actuator ring 141, annular grooves 142 are provided into which projections of slide shoes 147 enter so that actuator ring 141 can be displaced a comparatively great distance for providing a great eccentricity and a corresponding large displacement volume produced by a long stroke of the displacement elements 146.

The slide shoes 147 are mounted on the guide bodies of the assemblies 146, and substantial forces can be transmitted during the inward movement of the displacement means 146 into the displacement chambers 145 or 156, respectively.

A valve 36 receives fluid from a control pump 33 which is mounted on shaft 34. Shaft 34 has a key groove and key 35 for connection with the prime mover 65. Control pump 33 delivers fluid through passage 37 from which pressure fluid is delivered to auxiliary devices, for example for operating the clutches 2, 3 and 51, 44, as described with reference to FIG. 1.

Control valve 36 is either manually controlled, or is controlled automatically from a remote station acting on the ordinarily manually operated handle 38.

By operation of control valve 36, the fluid discharged by control pump 33 can be directed into fluid line 37 or into fluid line 32. Fluid flows from fluid line 32 through an annular communication channel 31 and then through a passage 30, for example, in pump shaft 6 into the pressure fluid chamber 14 for operating clutch member 4 which is axially shifted on shaft portion 6 into engagement with clutch member 3 for connecting pump shaft portion 6 with transmission shaft 5.

As explained with reference to FIG. 1, pump 1 is a multiflow pump which produces two separate and independent flows of fluid through pairs of conduits, each of which may serve as an inlet or outlet conduit upon reversal of the flow.

One of the fluid flows enters through a control body 153 into a first group of displacement chambers 156 and leaves the same through control body 153 and control body 162 which are provided with channels for the fluid. The other flow of fluid flows through control body 153 into the second group of displacement chambers 145 and out of the same through channels in control body 253. Pairs of fluid lines 15, 17 or 16, 18 function as inlet passages while the other pairs function as discharge passages through which fluid under pressure is delivered.

In accordance with the invention, the control body 253 is secured to a passage in body 28 or made integral with the same. Body 28 is located within a portion 26 of the pump housing and is mounted in the same for limited axial movement so that an axial displacement of passage body 28 relative to housing part 26 is possible.

Body 28 has radial shoulders forming pressure chambers 21 and 22 within housing portion 26. Sealing means 191, 192 separate chambers 21, 22, permitting axial movement of body 28 without communication between chambers 21 and 22.

Body 28 has another shoulder on which a spring 23 abuts whose other end is supported on a shoulder 29 of housing portion 26 so that body 28 is urged into one axial end position while the pressure fluid in chambers 21 or 22 moves body 28 in axial direction opposite to the force of spring 23.

Body 28 and the control body 253 carried by the same are pressed against a control face 154 of rotor 144. When the fluid pressure in chambers 21 or 22 urges body 28 and control body 253 against one control face 154 of pump rotor 144, the other control face 154 of the same is pressed against a control face of control body 153 so that a good seal is maintained between rotor 144 and the nonrotating control bodies 53 and 253, while the friction is limited to the necessary minimum.

The effective cross sections of chambers 21 and 22 are dimensioned so that the pressure acting on body 28 is just sufficient for sealing the rotor end faces, without producing unduly high friction. The pressure chambers 21, 22 are actually dimensioned to produce a very low friction. However, excessive leakage is prevented by producing just sufficient axial pressures in chambers 21 and 22.

In order to obtain the best sealing condition, a small eccentricity is provided between the annular pressure chambers 21 and 22 so that the centers of the circular lines along which chambers 21 and 22 extend are radially spaced from each other.

This assures that body 28 is uniformly pressed against control body 253 so that a balance is obtained between the fluid pressures produced between the abutting faces of rotor 144 and control bodies 153, 253 on one hand, and the pressures produced by the fluid in chambers 21 and 22 acting in the opposite direction.

A passage 25 connects chamber 22 with outlet 19, and a passage 24 connects chamber 21 with outlet 20.

It is a characteristic feature of the invention that axial pressure of control body 253 exerted on rotor 144 and produced by the movable body 28 produces an almost uniformly balanced feeding pressure controlled by the pressure produced in the respective fluid chamber 21 or 22, or in both chambers.

When the pressure fluid is allowed to escape from one or both fluid chambers 21 and 22, spring 23 moves body 28 away from rotor 144 so that body 253 moves away from the same and a clearance forms between the confronting faces of rotor 144 and of control bodies 153 and 253. A comparatively large clearance, permitting the escape of fluid from the displacement chambers and from passages in the pump, may appear between rotor 144 and control body 153, or between rotor 144 and control body 253. Rotor 144 may rotate without contact with the control bodies 253 and 153 and without any friction.

Due to this arrangement, it is possible to supply the drive torque of the power plant 65 completely mechanically through pump shafts 34, 6 and then directly or indirectly to the driven rotor members of the machine or vehicle driven by the power plant 65 through the transmission arrangement of the invention, while no frictional losses take place in the inoperative pump 1. Preferably, control valve means are provided in fluid lines 15 to 18 for causing discharge of fluid, or of part of the fluid, from one or more of the fluid lines. Upon relief of the pressure, spring 23 automatically renders the pump ineffective, and rotor 144 rotates without any friction, except the friction in the anti-friction bearings supporting the shaft. However, since there is no radial load on the rotor, the friction losses in the bearings are very small.

The control valve means also permit establishment of communication between the fluid lines 15 to 18 for rendering the motors 56 and 57 inoperative so that the hydrostatic transmission elements can be completely disconnected from the mechanical transmission.

It will be understood that each of the elements described above, or two or more together, may also find a useful application in other types of transmissions differing from the types described above.

While the invention has been illustrated and described as embodied in a combined hydrostatic and mechanic transmission, it is not intended to be limited to the details shown, since various modifications and structural changes may be made without departing in any way from the spirit of the present invention.

I claim:

1. Combined hydrostatic and mechanical transmission arrangement comprising a power plant; positive displacement pump means including a housing, inlet and outlet conduits, a pump shaft passing through said housing, a pump rotor in said housing secured to said pump shaft, one end of said pump shaft being connected with said power plant and driven by the same, and adjusting means for adjusting the fluid volume pumped through said inlet and outlet conduits between no delivery and a maximum volume delivery; at least one fluid operated positive displacement motor connected with said inlet and outlet conduits and driven at a speed depending on the adjusted fluid volume of said pump means so as to stop when no fluid is delivered; at least one rotary member, transmission means connected with said rotary member and including a transmission member connected with and driven by said fluid operated motor; and mechanical transmission means connecting the other end of said pump shaft with said transmission member and including clutch means operable to connect and disconnect said pump shaft from said transmission member so that said rotary member can be selectively driven by a mechanical torque transmitted from said pump shaft to said transmission member, and by a torque produced by said fluid operated motor and transmitted to said transmission member.

2. A transmission arrangement as claimed in claim 1 wherein said pump means has additional inlet and outlet conduits and produces two separate flows in pairs of inlet and outlet conduits; and comprising another fluid operated motor connected with said additional inlet and outlet conduits, and driving said transmission member.

3. A transmission arrangement as claimed in claim 1 including fluid operated piston means and cylinder means for operating said clutch means, conduit means connecting said cylinder means with said pump means, and control valve means in said conduit means for controlling the movements of said piston means.

4. In a transmission device, in combination, a power plant having a revolvable member for supplying rotary power, at least one positive displacement first fluid handling device with variable displacement means therein for varying the rate of flow of fluid through said fluid handling device; means for connecting a rotary member of said first fluid handling device to said revolvable member of said power plant and including a shaft; at least one positive displacement second fluid handling device having a revolvable means which revolves when fluid flows through said second fluid handling device; fluid passage means for connecting said first fluid handling device and said second fluid handling device with each other; at least one rotary member; means for connecting said revolvable means of said second fluid handling device to said rotary member; a mechanical power transmission means and means for connecting said mechanical power transmission means to said shaft and to said rotary member and including clutch means and control means for controlling said clutch means and the connection and disconnection of said mechanical transmission means with said shaft for mechanical transmission of the rotary power from said power plant to said rotary member, and for governing the connection and disconnection of said first and second fluid handling devices with said rotary member for hydrostatic transmission of rotary power from said plant to said rotor.

5. The transmission device of claim 4 wherein said control means include hydraulically operating means.

6. The transmission device of claim 4 comprising a closeable fluid escape means connected to a portion of said first fluid handling device so that an opening of said fluid escape means discharges a quantity of fluid out of said portion so that the transmission of the rotary power thereby switches from hydrostatic transmission of the rotary power to mechanical transmission of the rotary power.

7. Fluid handling apparatus, comprising, in combination housing means; a fluid handling body in said housing means, and having at least one first annular control face, a plurality of working chambers, and passages connecting said working chambers with said first annular control face and having ports on the latter; displacement means movably mounted in said working chambers; actuating means for actuating said displacement means to cause expansion and contraction of said working chambers during relative rotational movement between said actuating means and said fluid handling body about an axis; inlet and outlet means on said housing means for the admission and discharge of fluid; and annular control body means mounted in said housing means for movement toward and away from said fluid handling body and having a second annular control face abutting said first annular control face of said fluid handling body, said control body means forming in said housing means at least one annular counter pressure chamber, and having control passages communicating with said inlet and outlet means and with said counter pressure chamber and having ports on said second annular control face so that fluid is supplied and discharged through said passages to said working chambers while the pressure in the latter urges said control body means away from said fluid handling body and the pressure in said counter pressure chamber urges said first and second annular control faces into sealing and sliding abutment.

8. A fluid handling apparatus as claimed in claim 7 wherein said control body means form two annular counter pressure chambers in said housing means, said two annular counter pressure chambers being spaced from each other in axial direction.

9. A fluid handling apparatus as claimed in claim 8 wherein said annular counter pressure chambers are spaced different distances from said axis, respectively, and have different diameters.

10. A fluid handling apparatus as claimed in claim 8 wherein the center of each counter pressure chamber is eccentric to the center of the other counter pressure chamber.

11. A fluid handling apparatus as claimed in claim 7 comprising spring means between said fluid handling body and said control body means for urging the latter away from said fluid handling body against the pressure in said counter pressure chamber.

12. A fluid handling apparatus as claimed in claim 11 comprising control valve means controlling the flow of fluid from said counter pressure chamber so that when the pressure is relieved in said counter pressure chamber, no friction prevails between said first and second control faces.

References Cited

UNITED STATES PATENTS

| 2,289,865 | 7/1942 | Benedek. |
| 2,458,985 | 1/1948 | Ferris et al. |
| 2,608,933 | 9/1952 | Ferris. |
| 3,357,362 | 12/1967 | Orr. |
| 1,951,345 | 3/1934 | Centervall. |
| 2,257,724 | 10/1941 | Bennetch. |
| 2,874,533 | 2/1959 | Schott. |
| 3,104,528 | 9/1963 | Horig _____ 60—53 XR |
| 3,131,580 | 5/1964 | Forster. |
| 3,184,913 | 5/1965 | Anderson et al. _____ 60—53 XR |
| 3,261,421 | 7/1966 | Forster et al. _____ 60—53 XR |

EDGAR W. GEOGHEGAN, Primary Examiner

U.S. Cl. X.R.

60—53, 6; 74—665; 103—161